United States Patent
Jiang et al.

(10) Patent No.: US 9,119,181 B2
(45) Date of Patent: Aug. 25, 2015

(54) METHODS AND APPARATUS FOR ENABLING CID REUSE IN LTE BASED D2D COMMUNICATIONS

(71) Applicant: QUALCOMM Incorporated, San Diego, CA (US)

(72) Inventors: Libin Jiang, Bridgewater, NJ (US); Saurabh R. Tavildar, Jersey City, NJ (US); Ritesh K. Madan, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 13/679,075

(22) Filed: Nov. 16, 2012

(65) Prior Publication Data

US 2014/0140222 A1     May 22, 2014

(51) Int. Cl.
*H04W 4/00*     (2009.01)
*H04W 76/02*     (2009.01)
*H04W 74/00*     (2009.01)

(52) U.S. Cl.
CPC .......... *H04W 76/021* (2013.01); *H04W 74/002* (2013.01); *H04W 76/023* (2013.01)

(58) Field of Classification Search
None
See application file for complete search history.

(56) References Cited

U.S. PATENT DOCUMENTS

| | | |
|---|---|---|
| 8,107,883 B2 | 1/2012 | Peng et al. |
| 2012/0051315 A1 | 3/2012 | Wang et al. |
| 2012/0147745 A1 | 6/2012 | Wang et al. |

FOREIGN PATENT DOCUMENTS

| | | | |
|---|---|---|---|
| WO | WO2011050519 A1 | 5/2011 | |
| WO | WO2011069295 A1 | 6/2011 | |
| WO | WO 2012/135392 A1 * | 10/2012 | ............ H04W 72/08 |
| WO | WO-2012135392 A1 | 10/2012 | |

OTHER PUBLICATIONS

Baker, "LTE-Advanced Physical Layer", Dec. 17, 2009, 3GPP, all slides (48).*
International Search Report and Written Opinion—PCT/US2013/070395—ISA/EPO—Apr. 28, 2014.
(Continued)

*Primary Examiner* — Kwang B Yao
*Assistant Examiner* — Adam Duda
(74) *Attorney, Agent, or Firm* — James K. O'Hare

(57) ABSTRACT

A method, an apparatus, and a computer program product for wireless communication are provided in connection with minimizing D2D RTS/CTS signaling overhead resource usage. In one example, a WAN entity is equipped to receive one or more channel gain values from a plurality of UEs, determine that a CID can be reused by multiple D2D links based on the received one or more channel gain values, and transmit information indicating that the CID may be reused. In another example, a UE is equipped to measure a direct power signals and an inverse power echoes on a CID used for a link formed between a third and fourth UE, and determine that the CID may potentially be reused by a link formed with a second UE for D2D RTS/CTS signaling, based at least in part on the measured direct power signals, measured the inverse power echoes, and a SIR threshold.

44 Claims, 14 Drawing Sheets

(56) References Cited

OTHER PUBLICATIONS

Jaheon Gu., et al., "Dynamic power control mechanism for interference coordination of device-to-device communication in cellular networks", Ubiquitous and Future Networks (ICUFN), 2011 Third International Conference on, IEEE, Jun. 15, 2011, pp. 71-75, XP032003644, DOI: 10.1109/ICUFN.2011.5949138 ISBN: 978-1-4577-1176-3 p. 2, right-hand column, paragraph 13—p. 3, left-hand column, line 27.

Wu, X., et al., "FlashLinQ: A synchronous distributed scheduler for peerto-peer ad hoc networks", Communication, Control, and Computing(Allerton), 2010 48th Annual Allerton Conference on, IEEE, Sep. 29, 2010, pp. 514-521, XP031899421, DOI: 10.1109/ALLERTON.2010.5706950, ISBN: 978-1-4244-8215-3.

* cited by examiner

METHODS AND APPARATUS FOR ENABLING CID REUSE IN LTE BASED D2D COMMUNICATIONS

BACKGROUND

1. Field

The present disclosure relates generally to communication systems, and more particularly, to supporting device-to-device communication within a long term evolution (LTE) based network while minimizing Request-To-Send/Clear-To-Send (RTS/CTS) signaling overhead resource usage.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (peer-to-peer) communication (e.g., LTE-Direct).

Currently, an aspect of supporting device to device (D2D) communications in an LTE environment (e.g., LTE-Direct) is use of distributed scheduling. Distributed scheduling refers to the mechanism of coordinating, in a distributed way, the D2D transmissions of different links without incurring excessive interference among them. This can be done through RTS/CTS handshake signaling before the DATA transmissions. In LTE-Direct, there is a RTS block and a CTS block before each phase of DATA transmissions. In an aspect, there may be 24 resource blocks (RBs) in the RTS block (and in the CTS block). Each D2D link may use a pair of RBs in the same location in the RTS block and CTS block, which we refer to as a connection ID (CID) resource, for RTS/CTS transmissions. As such, each link may use a sequence (e.g., a Zadoff-Chu sequence) in the RTS/CTS transmissions, and an RTS/CTS can be decoded successfully if its signal to interference ratio (SIR) is above a threshold. Minimizing RTS/CTS overhead helps to achieve high throughput of D2D communications. This overhead can become significant in terms of time frequency resources used for RTS/CTS signaling.

As the demand for device-to-device communication increases, there exists a need for methods/apparatuses for supporting device-to-device communication within LTE while minimizing RTS/CTS signaling overhead resource usage.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with minimizing D2D RTS/CTS signaling overhead resource usage. In one example, a WAN entity (e.g., eNodeB, MME, etc.) is equipped to receive one or more channel gain values from a plurality of UEs, determine that a CID can be reused by multiple D2D links based on the received one or more channel gain values, and transmit information indicating that the CID may be reused. In another example, a UE is equipped to measure a direct power signals and an inverse power echoes on a CID used for a link formed between a third and fourth UE, and determine that the CID may potentially be reused by a link formed with a second UE for D2D RTS/CTS signaling, based at least in part on the measured direct power signals, measured the inverse power echoes, and a SIR threshold ($\beta$).

According to related aspects, a method for minimizing D2D RTS/CTS signaling overhead resource usage is provided. The method can include receiving, by a WAN entity, one or more channel gain values from a plurality of UEs. Further, the method can include determining that a CID can be reused based on the received one or more channel gain values. Moreover, the method may include transmitting information indicating that the CID may be reused.

Another aspect relates to a communications apparatus for minimizing D2D RTS/CTS signaling overhead resource usage. The communications apparatus can include means for receiving, by a WAN entity, one or more channel gain values from a plurality of UEs. Further, the communications apparatus can include means for determining that a CID can be reused based on the received one or more channel gain values. Moreover, the communications apparatus can include means for transmitting information indicating that the CID may be reused.

Another aspect relates to a communications apparatus. The apparatus can include a processing system configured to receive, by a WAN entity, one or more channel gain values from a plurality of UEs. Further, the processing system may be configured to determine that a CID can be reused based on the received one or more channel gain values. Moreover, the processing system may further be configured to transmit information indicating that the CID may be reused.

Still another aspect relates to a computer program product, which can have a computer-readable medium including code for receiving, by a WAN entity, one or more channel gain values from a plurality of UEs. Further, the computer-readable medium can include code for determining that a CID can be reused based on the received one or more channel gain values. Moreover, the computer-readable medium can include code for transmitting information indicating that the CID may be reused.

According to related aspects, a method for minimizing D2D RTS/CTS signaling overhead resource usage is provided. The method can include measuring, by a first UE, a direct power signal and an inverse power echo from each of a third UE and a fourth UE on a CID used for a link formed between the third UE and fourth UE. Moreover, the method may include determining that the CID may potentially be reused by a link formed between the first UE and a second UE for D2D RTS/CTS signaling, based at least in part on the measured direct power signals, measured the inverse power echoes, and a SIR threshold.

Another aspect relates to a wireless communications apparatus enabled for minimizing D2D RTS/CTS signaling overhead resource usage. The wireless communications apparatus can include means for measuring, by a first UE, a direct power signal and an inverse power echo from each of a third UE and a fourth UE on a CID used for a link formed between the third UE and fourth UE. Moreover, the wireless communications apparatus can include means for determining that the CID may potentially be reused by a link formed between the first UE and a second UE for D2D RTS/CTS signaling, based at least in part on the measured direct power signals, measured the inverse power echoes, and a SIR threshold.

Another aspect relates to a wireless communications apparatus. The apparatus can include a processing system configured to measure a direct power signal and an inverse power echo from each of a third UE and a fourth UE on a CID used for a link formed between the third UE and fourth UE. Moreover, the processing system may further be configured to determine that the CID may potentially be reused by a link formed between the first UE and a second UE for D2D RTS/CTS signaling, based at least in part on the measured direct power signals, measured the inverse power echoes, and a SIR threshold.

Still another aspect relates to a computer program product, which can have a computer-readable medium including code for measuring, by a first UE, a direct power signal and an inverse power echo from each of a third UE and a fourth UE on a CID used for a link formed between the third UE and fourth UE. Moreover, the computer-readable medium can include code for determining that the CID may potentially be reused by a link formed between the first UE and a second UE for D2D RTS/CTS signaling, based at least in part on the measured direct power signals, measured the inverse power echoes, and a SIR threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
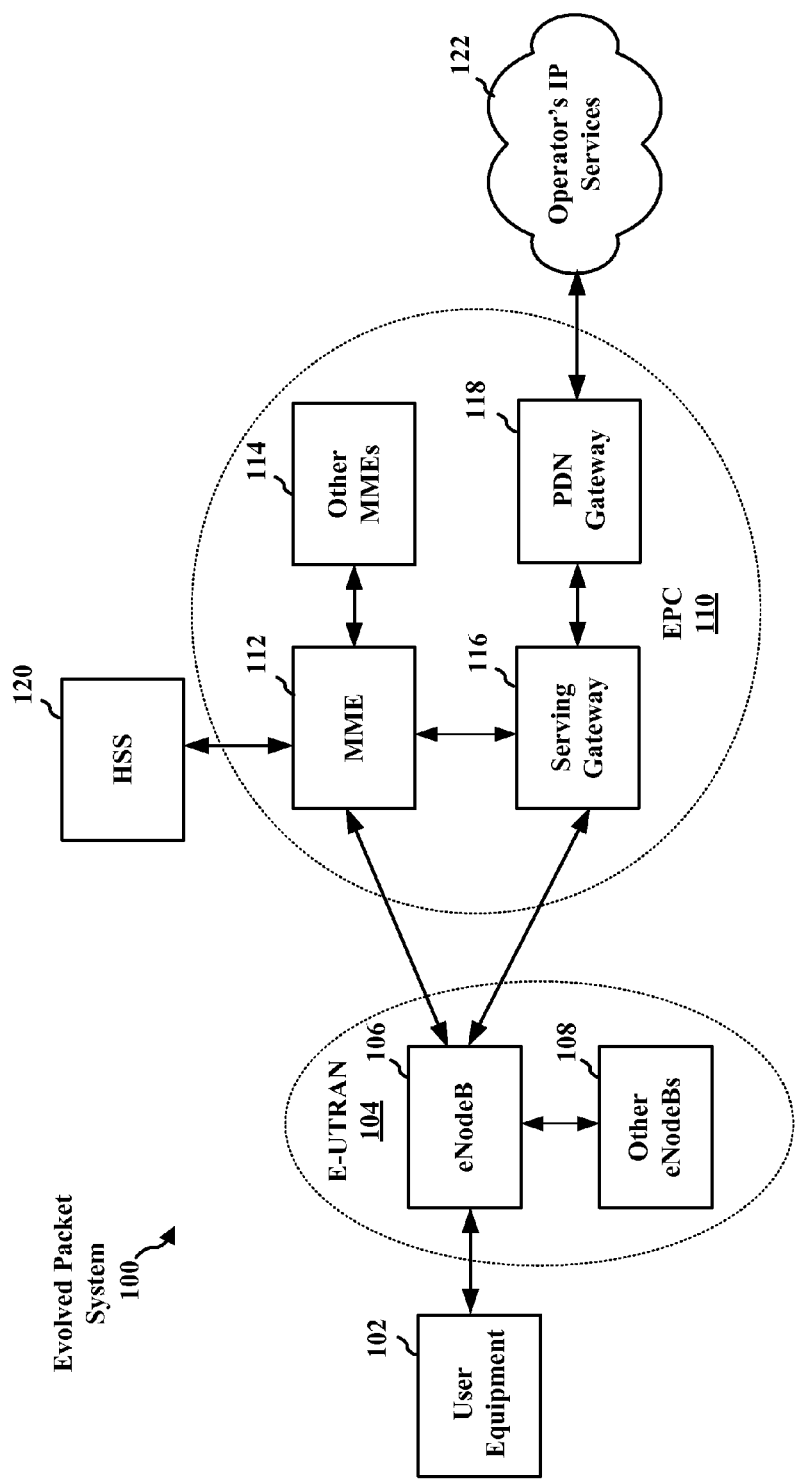
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
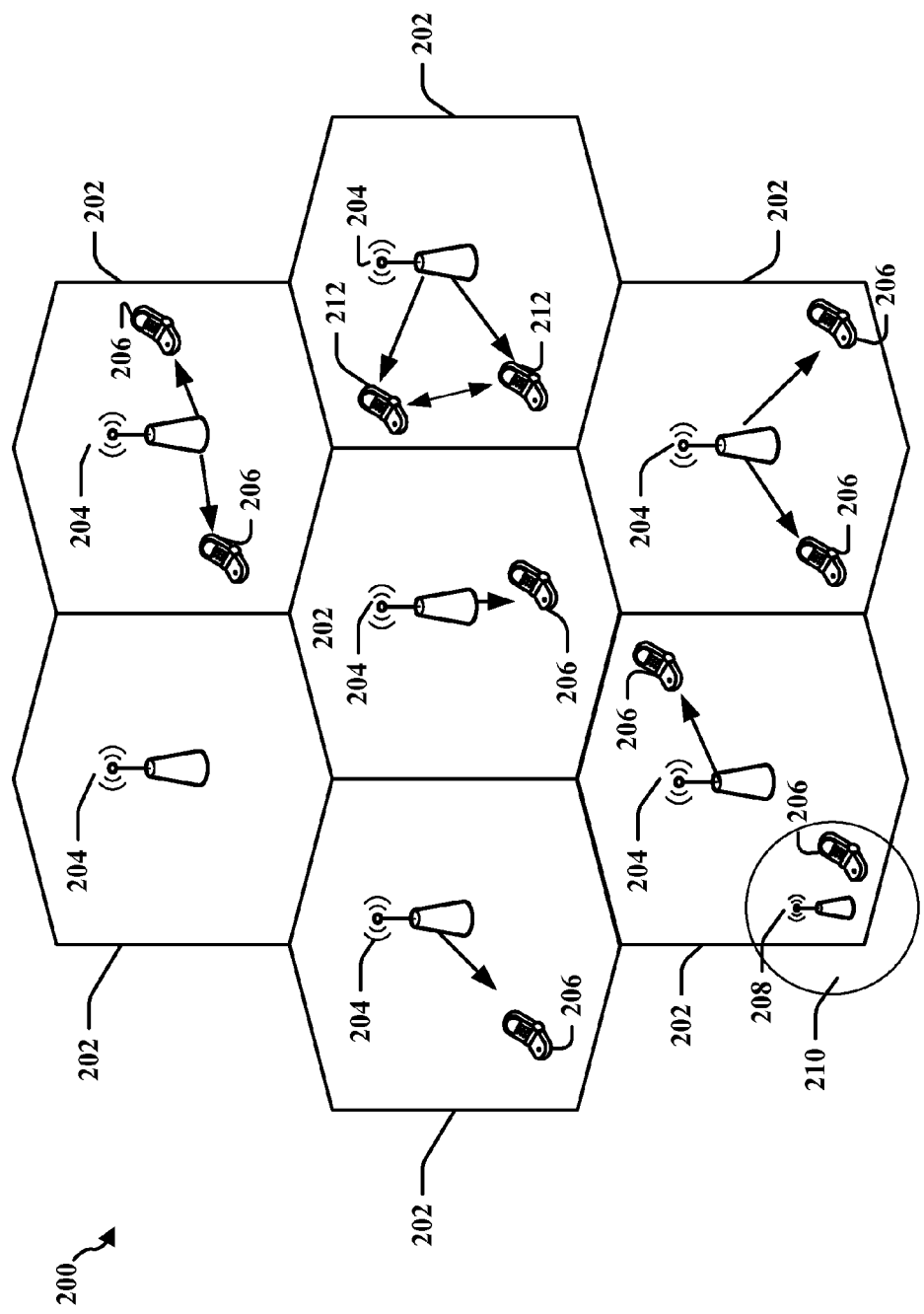
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
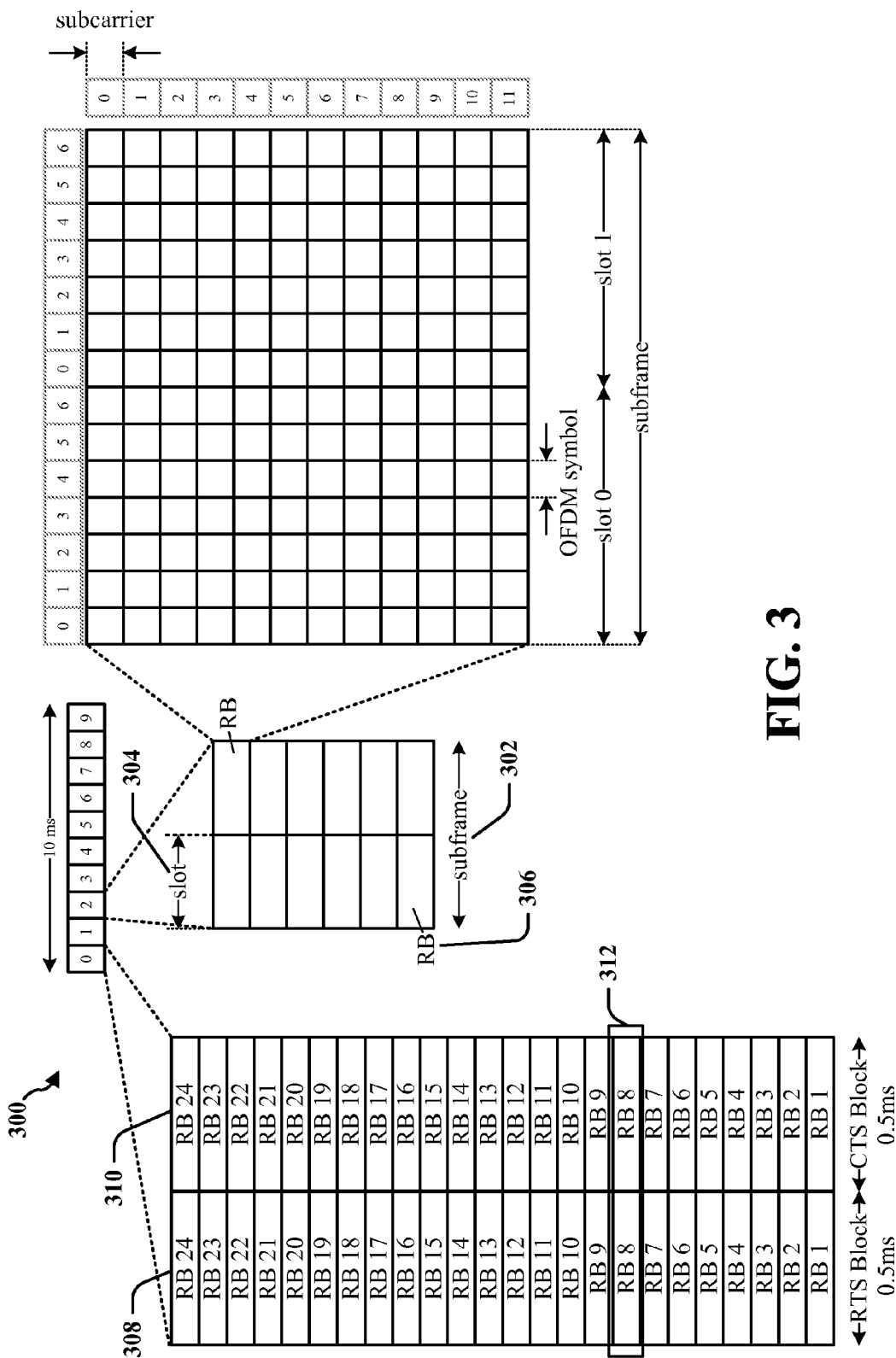
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames 302. Each sub-frame 302 may include two consecutive time slots 304. A resource grid may be used to represent two time slots, each time slot including a resource block (RB) 306. In LTE, the resource grid is divided into multiple resource elements. Further, in LTE, a RB 306 contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

In LTE-Direct (e.g., D2D communications in an LTE environment), scheduling of D2D communication links may be performed through distributed scheduling. In an aspect, request to send (RTS)/clear to send (CTS) handshake signaling may be performed before each device in a D2D pair attempts to communicate data over a D2D communications link. In LTE-Direct, 24 RBs may be available for RTS/CTS signaling. Further, in LTE-Direct, a RB may be assigned as a RTS block 308 and another RB may be assigned as a CTS block 310 for each D2D communication link. In other words, each D2D communication link may use a RB pair for RTS/CTS signaling. As used herein, the RB pair may be referred to as a connection identifier (CID) 312. In an operation aspect, to achieve efficient throughput of D2D communications in the LTE-Direct based network, low overhead from RTS/CTS signaling may be sought. As described in further detail herein, reuse of CIDs by different D2D communications link may assist in reducing overhead, where the UEs associated with the different D2D communications link are sufficient far apart.

Figure 4:
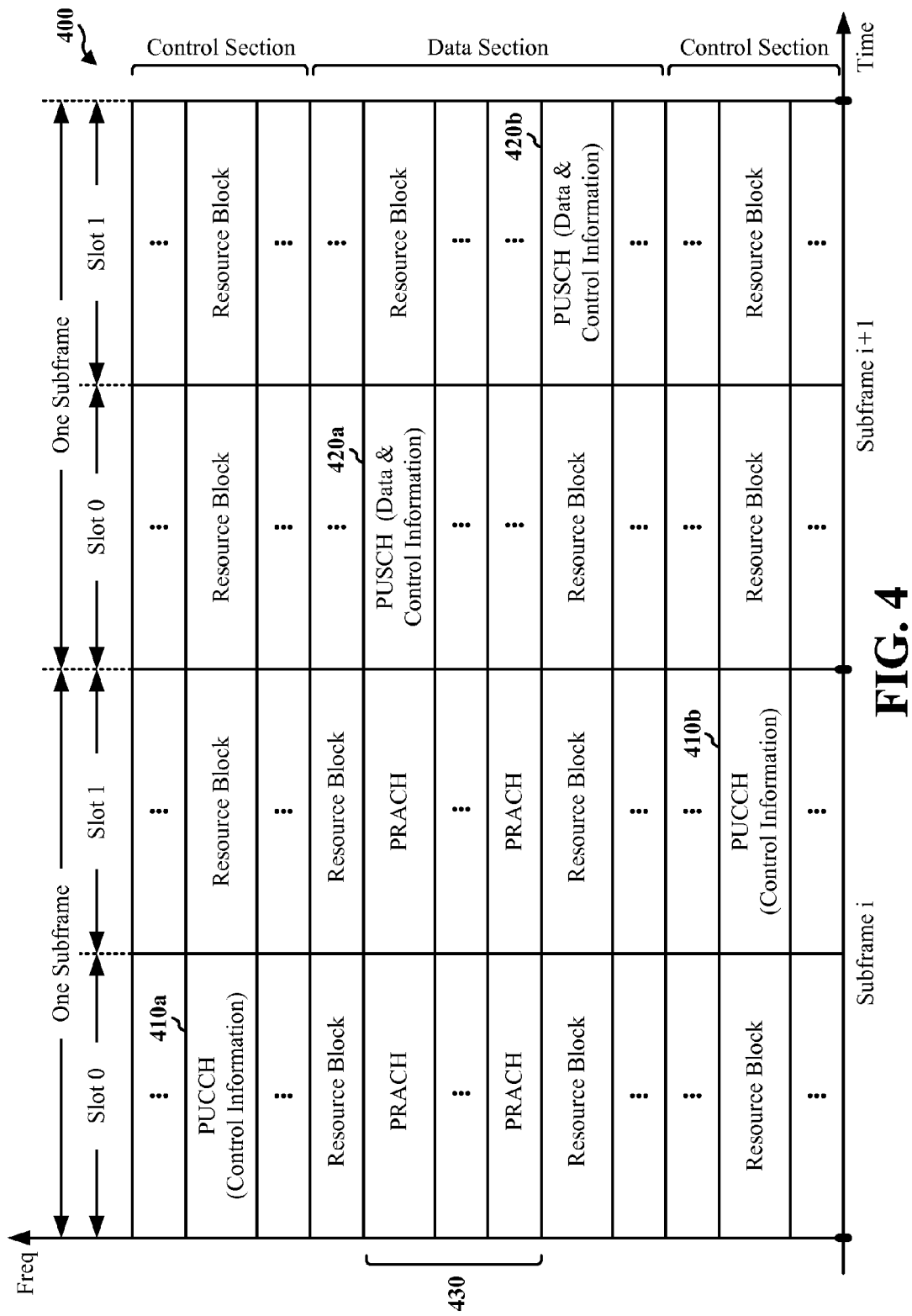
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. In an aspect, a RACH sequence may be reserved for communications of ACK/NACK information from a UE while in idle mode. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
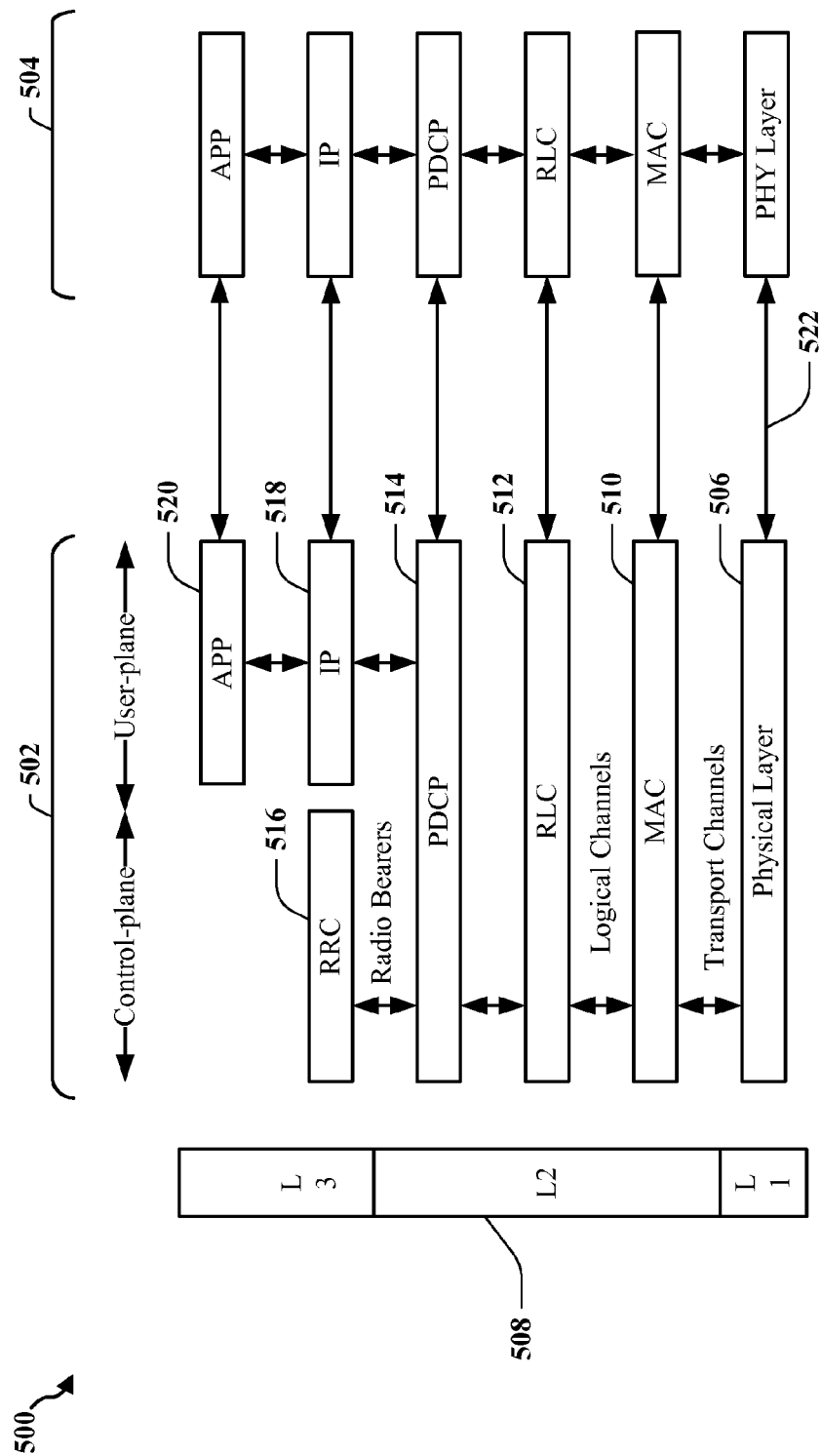
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the 502 UE and the 504 eNB is shown with three layers: Layer 1, Layer 2, and Layer 3. Communication 522 of data/signaling may occur between UE 502 and eNB 504 across the three layers. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB 504 and the UE 502. The user plane also includes an internet protocol (IP) sublayer 518 and an application sublayer 520. The IP sublayer 518 and application sublayer 520 are responsible for supporting communication of application data between the eNB 504 and the UE 502.

Figure 6:
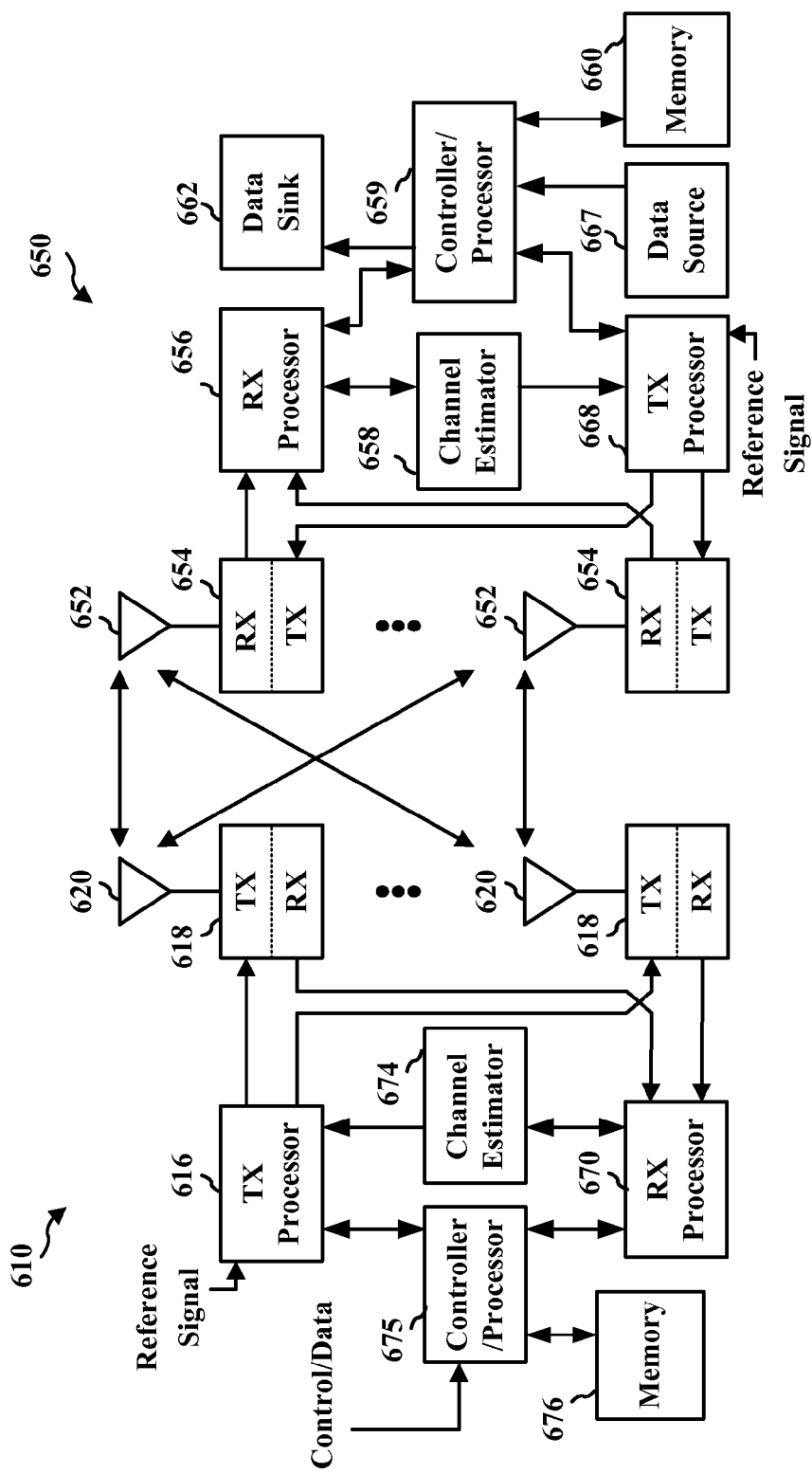
FIG. 6 is a diagram illustrating an example of an evolved Node B and user equipment in an access network.

FIG. 6 is a block diagram of a WAN entity (e.g., eNB, MME, etc.) 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the WAN entity 610. These soft decisions may be based on channel estimates computed by the channel estimator 658. The soft decisions are then decoded and deinterleaved to recover the data and control signals that were originally transmitted by the WAN entity 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the DL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the WAN entity 610, the controller/processor 659 implements the L2 layer for the user plane and the control plane by providing header compression, ciphering, packet segmentation and reordering, and multiplexing between logical and transport channels based on radio resource allocations by the WAN entity 610. The controller/processor 659 is also responsible for HARQ operations, retransmission of lost packets, and signaling to the WAN entity 610.

Channel estimates derived by a channel estimator 658 from a reference signal or feedback transmitted by the WAN entity 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the WAN entity 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
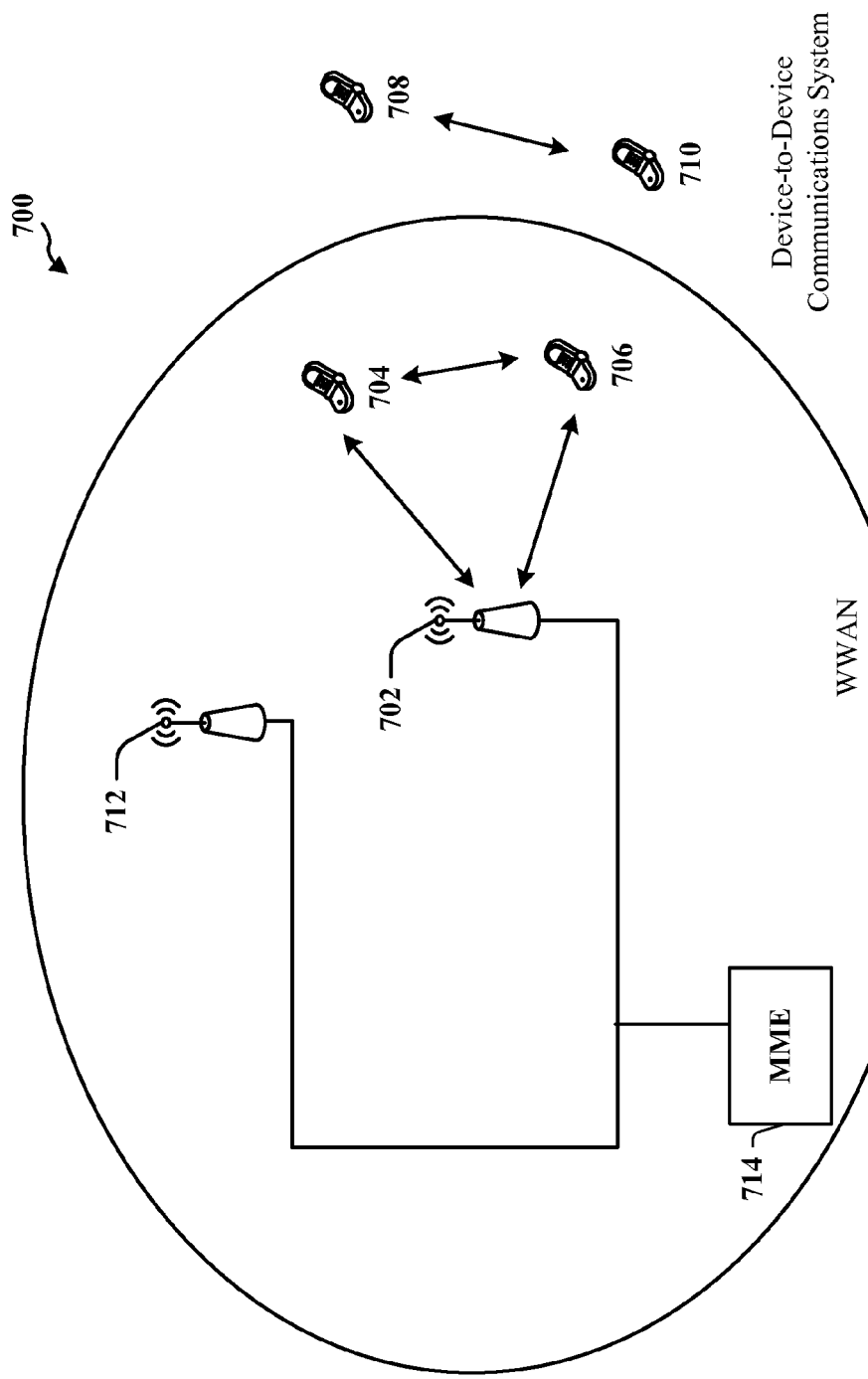
FIG. 7 is a diagram illustrating a device-to-device communications network.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. In another aspect, the WWAN may include multiple base stations (702, 712) that may provide a coordinated communications environment through connectivity provided via one or more network entities (e.g., MME 714).

For example, as shown in FIG. 7, the wireless devices 708, 710 are in device-to-device communication and the wireless devices 704, 706 are in device-to-device communication. The wireless devices 704, 706 are also communicating with the base station 702.

In an operational aspect, eNB 702 may communicate resource allocation information to UEs (704, 706, 708, 710). In an aspect, the resource allocation information may be generated by a third party server, another UE 706, and/or an entity in the communication system 700 (e.g., MME 714, eNB 712). In an aspect, at least part of the resource allocation information may indicate one or more CIDs may be reused. In such an aspect, a determination as to whether any CIDs are may be reused may be made by a WAN entity (e.g., MME 714, eNB 712) based at least in part on received channel gain information from UEs (704, 706, 708, 710) in the communication system 700. In another aspect, a determination as to whether a CID may be reused may be performed by a UE (e.g., 704) based at least in part on measured of direct power signals and inverse power echoes received from potential interfering UEs (708, 710). In such an aspect, the UE 704 may also use a SIR threshold as part of the determination. Further discussion of a WAN entity based CID reuse scheme is provided with reference to FIGS. 8 and 9. Additionally, further discussion of a UE based CID reuse scheme is provided with reference to FIGS. 8 and 12.

Figure 8:
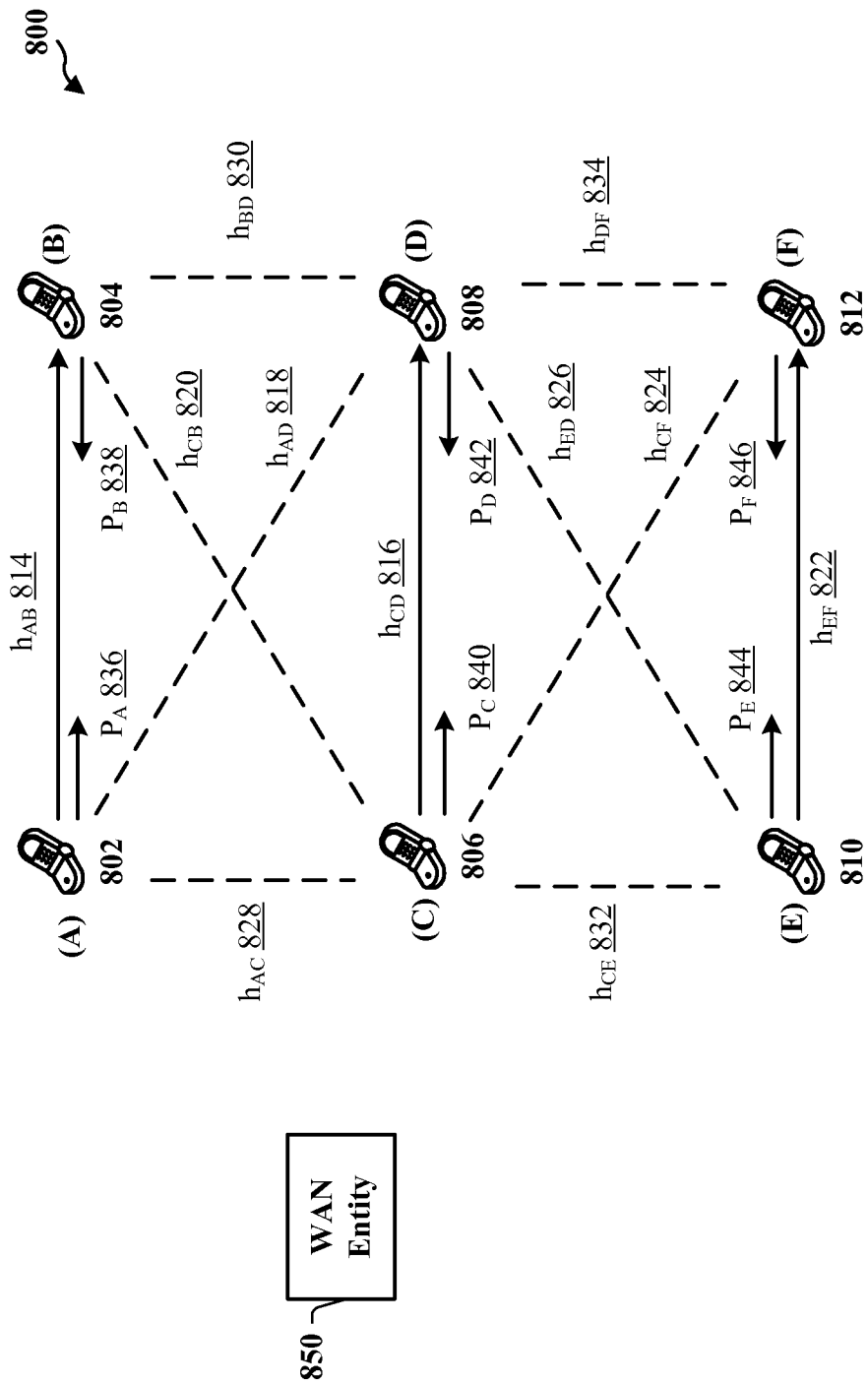
FIG. 8 is a diagram illustrating communications and interference between devices in a device-to-device communications network.

FIG. 8 is a diagram of communications and interference between devices in a device-to-device communications network 800. Device-to-device communications network 800 may include multiple UEs: UE A, UE B, UE C, UE D, and optionally UE E and UE F (e.g., UEs 802, 804, 806, 808, and optionally 810, and 812), and a WAN entity (e.g., eNB, MME, etc.). Each UE may transmit a transmission power (P), and each UE may measure a channel gain (h) from another UE. In an aspect, UE A 802 may transmit with a transmit power $P_A$ 836 and measure channel gains $h_{AB}$ 814, $h_{AD}$ 818, and $h_{AC}$ 828. In an aspect, UE B 804 may transmit with a transmit power $P_B$ 838 and measure channel gains $h_{AB}$ 814, $h_{CB}$ 820, and $h_{BD}$ 830. In an aspect, UE C 806 may transmit with a transmit power $P_C$ 840 and measure channel gains $h_{CD}$ 816, $h_{CB}$ 820, and $h_{AC}$ 828. Further, in an aspect in which device-to-device communications network includes UE E and UE F, the UE C may further measure channel gains $h_{CE}$ 832 and $h_{CF}$ 824. In an aspect, UE D 808 may transmit with a transmit power $P_D$ 842 and measure channel gains $h_{CD}$ 816, $h_{AD}$ 826, and $h_{BD}$ 830. Further, in an aspect in which device-to-device communications network includes UE E and UE F, the UE D may further measure channel gains $h_{ED}$ 826 and $h_{DF}$ 834. In an optional aspect, UE E 810 may transmit with a transmit power $P_E$ 844 and measure channel gains $h_{EF}$ 822, $h_{CE}$ 832, and $h_{ED}$ 826. In another optional aspect, UE F 812 may transmit with a transmit power $P_F$ 846 and measure channel gains $h_{EF}$ 822, $h_{CF}$ 824, and $h_{DF}$ 834. In an aspect, the various transmission powers and channel gains may be measured by the various UEs and communicated to one or more WAN entities 850.

In an operational aspect in which the device-to-device communication network 800 includes UEs A, B, C, and D, UE A 802 and UE B 804 may be a UE pair with an established D2D link that is using an allocated CID. On this link, either UE A or UE B may send an RTS to the other UE to initiate a data transmission. UE A's RTS may be transmitted with power $P_A$, and UE B's CTS may be transmitted with an inverse power echo power $K/(P_A h_{AB})$ is inversely proportional to the received RTS power from UE A. In an aspect, K may be a positive constant defined by the WAN entity 850. Similarly, when UE B initiates a transmission, then UE B's RTS may be transmitted with power $P_B$, and UE A's CTS may be transmitted with an inverse power echo power $K/(P_B h_{BA})$. For a D2D link between UE C and UE D to reuse the CID used between UE A 802 and UE B 804, RTS/CTS may be self decodable, RTS interference may be decodable, and CTS interference may be decodable. These decodability metrics may be determined through analysis of measured channel gain values, transmission power values and decidability threshold values. For UE pair CD to use a CID that is being used by the UE pair AB, a WAN entity 850 may determine whether interference from UE C 806 to UE A 802 and from UE D 808 to UE A 802 is less than a first threshold value. In such an aspect, interference from UE C 806 to UE A 802 may be defined by $P_C$ 840 multiplied by channel gain $h_{AC}$ 828. Further, in such an aspect, the first threshold value may be equal to a decoding constant value γ multiplied by $P_B$ 838 and channel gain $h_{AB}$ 814. In other words, $$\frac{P_B h_{AB}}{P_C h_{AC}} \geq \gamma^{-1}.$$

Further, WAN entity 850 may determine whether interference from UE C 806 to UE B 804 and from UE D 808 to UE B 804 is less than a second threshold value. In such an aspect, interference from UE C 806 to UE B 804 may be $P_C$ 840 multiplied by channel gain $h_{CB}$ 828. Further, in such an aspect, the second threshold value may be equal to γ multiplied by $P_A$ 836 and channel gain $h_{AB}$ 814. In other words, $$\frac{P_A h_{AB}}{P_C h_{CB}} \geq \gamma^{-1}.$$

In an aspect, the first and second threshold values may use the same decoding constant value. In another aspect, γ may be a threshold value for decoding RTS/CTS signaling and may be defined by WAN entity 850. In such an aspect, WAN entity 850 may select a value for γ such that γ is less than or equal to the inverse value of a SIR threshold value for decoding RTS/CTS signals. Furthermore, WAN entity 850 may determine, analogously, whether the interference from UE A 802 and UE B 804 to UE C 806 and UE D 808 is small enough.

In an operational aspect in which the device-to-device communication network 800 includes UEs A, B, C, D, E, and F, a CID may be reused by UE pairs AB, CD, and EF, when a total interference from UEs C, D, E and F to UE A is less than a first threshold value, a total interference from UEs C, D, E and F to UE B is less than a second threshold value, and other analogous conditions on the interference to UEs C, D, E, and F are satisfied. In an aspect, the total interference measured by UE A 802 may equal a sum of received powers from UE C 806, UE D 808, UR E 810, and UE F 812. Further, a first threshold value may equal a decoding constant value (γ') multiplied $P_B$ 838 and channel gain $h_{AB}$ 814. In another aspect, the total interference measured by UE B 804 may equal a sum of received powers from UE C 806, UE D 808, UR E 810, and UE F 812. Further, a second threshold value may equal γ' multiplied $P_A$ 836 and channel gain $h_{AB}$ 814. In an aspect, γ' may be defined by WAN entity 850.

In another operational aspect in which the device-to-device communication network 800 includes at least two D2D links, a UE may determine whether a CID has a potential for reuse based at least in part on measured direct power signals, inverse power echoes, and a signal to interference ratio (SIR) threshold (β). For example, when UE C 806 and UE D 808 are attempting to reuse a CID used between UE A 802 and UE B 804, UE C 806 determines that the CID may potentially be reused if $$\frac{P_D h_{DC}}{P_A h_{AC}} \geq \beta, \frac{P_D h_{DC}}{P_B h_{BC}} \geq \beta, \frac{P_A h_{AB}}{P_C h_{CB}} \geq \beta \text{ and } \frac{P_B h_{BA}}{P_C h_{CA}} \geq \beta$$

(for any link AB that uses the CID). If so, UE C may attempt to establish a D2D link with UE D using the CID. However, link CD can use the CID only if UE D has also determined that the CID can be potentially reused. In an aspect, β may be provided by WAN entity 850. In such an aspect, WAN entity 850 may select a value for β such that γ is larger than max $\{\rho\gamma_d, \gamma_d\}$, where ρ is the SIR threshold for decoding DATA transmissions and $\gamma_d$ is the SIR threshold for decoding RTS/CTS signals.

Figure 9:
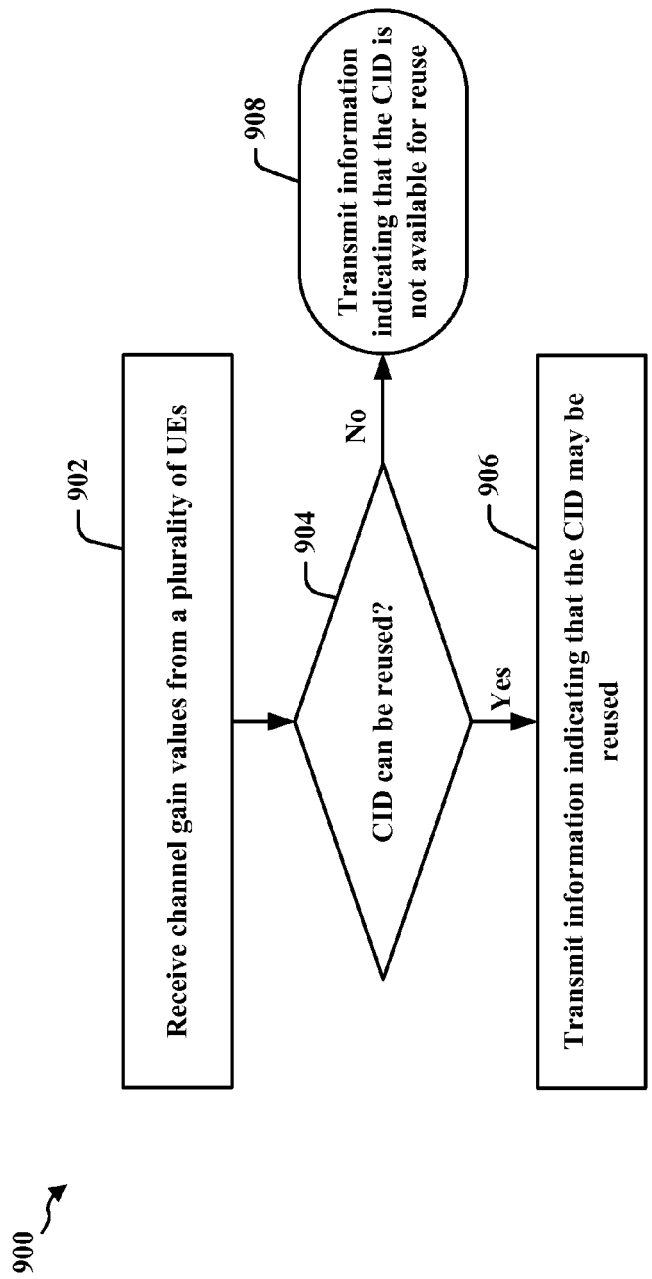
FIG. 9 is a flow chart of a first method of wireless communication.
Figure 12:
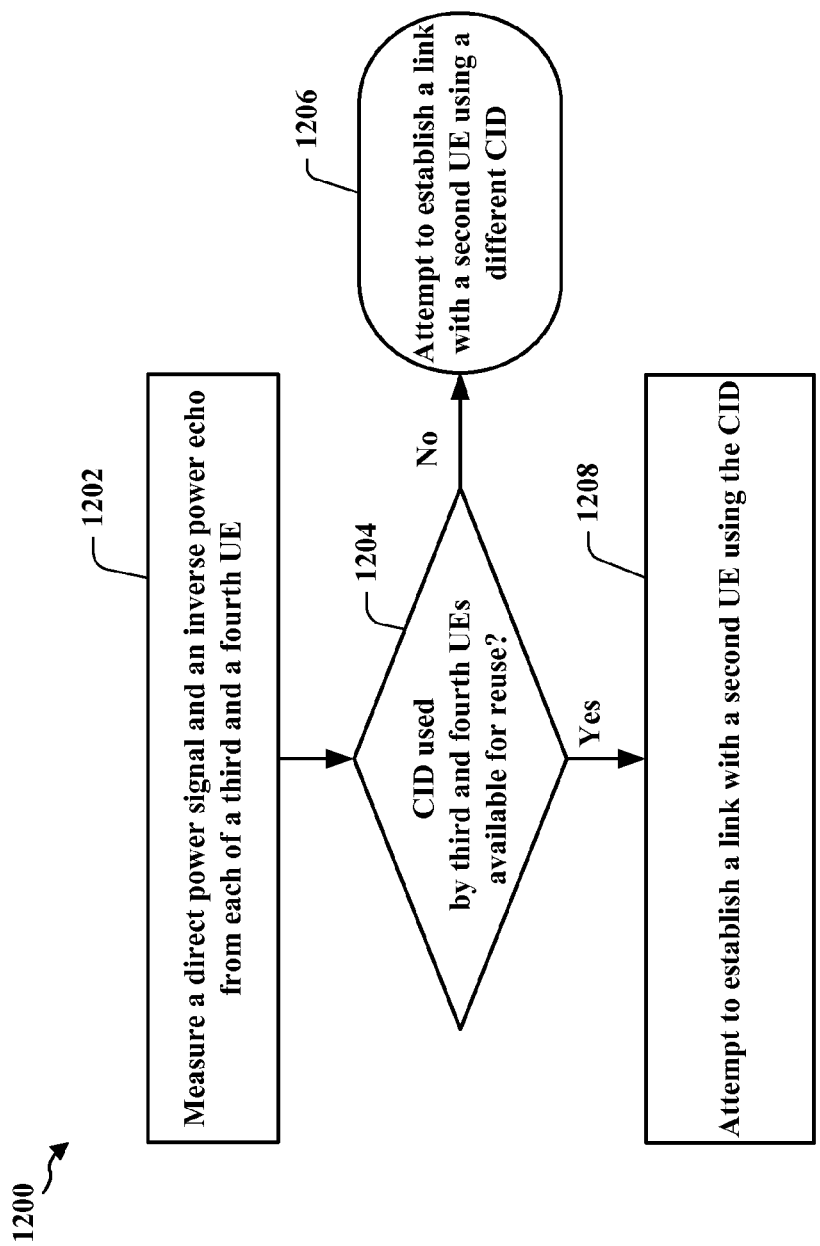
FIG. 12 is a flow chart of a second method of wireless communication.

FIGS. 9 and 12 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 is a flow chart 900 of a first method of wireless communication. The method may be performed by an eNodeB, an MME, etc.

At block 902, a wide area network (WAN) entity (e.g., eNB, MME, etc.) receive channel gain (h) values from a plurality of UEs. In an aspect, each UE may measure the channel gains from any and/or all other UEs through reference signals.

At block 904, the WAN entity may determine whether a CID may be reused. For example, consider two links (AB and CD). For the two links to use the same CID, RTS/CTS may be self decodable, RTS interference may be decodable, and CTS interference may be decodable. As noted above, UE A's RTS may be transmitted with power $P_A$, and UE B's CTS may be transmitted with an inverse power echo power $K/(P_A h_{AB})$. RTS/CTS self decodability means that within a link, a UE can decode the RTS or CTS sent by the other UE. RTS/CTS self decodability is satisfied if $$\frac{P_A h_{AB}}{P_C h_{CB}} \geq \gamma_d$$

(i.e., UE B can decode UE A's RTS when UE C is sending an RTS contemporaneously on the same CID), $$\frac{h_{AB} K/(P_A h_{AB})}{h_{DA} K/(P_C h_{CD})} = \frac{P_C h_{CD}}{P_A h_{AD}} \geq \gamma_d$$

(i.e., UE A can decode UE B's CTS when UE D is sending a CTS contemporaneously on the same CID), and other analogous conditions are satisfied, wherein $\gamma_d$ is the SIR threshold for decoding RTS/CTS. RTS and CTS interference decodability means that, for example, if UE A's DATA transmission would interfere with UE C's DATA transmission to D, then D should detect A's RTS (for receiver-yielding), and A should detect D's CTS (for transmitter-yielding). RTS/CTS interference decodability is satisfied if $\gamma_d \leq 1/\rho$ wherein $\rho$ is the SIR threshold to decode DATA transmissions.

If at block 904, the WAN entity determines that a CID may be reused, then at block 906, the WAN entity may transmit information indicating that the CID may be reused. In an aspect, the information may include resource allocation information indicating the CIDs that may be reused.

By contrast, if at block 904, a CID is determined not to be available for reuse, then at block 908, WAN entity may indicate that the CID is not available for reuse. In an aspect, the indication may be performed through a transmission indicating that the CID is not available for reuse.

Figure 10:
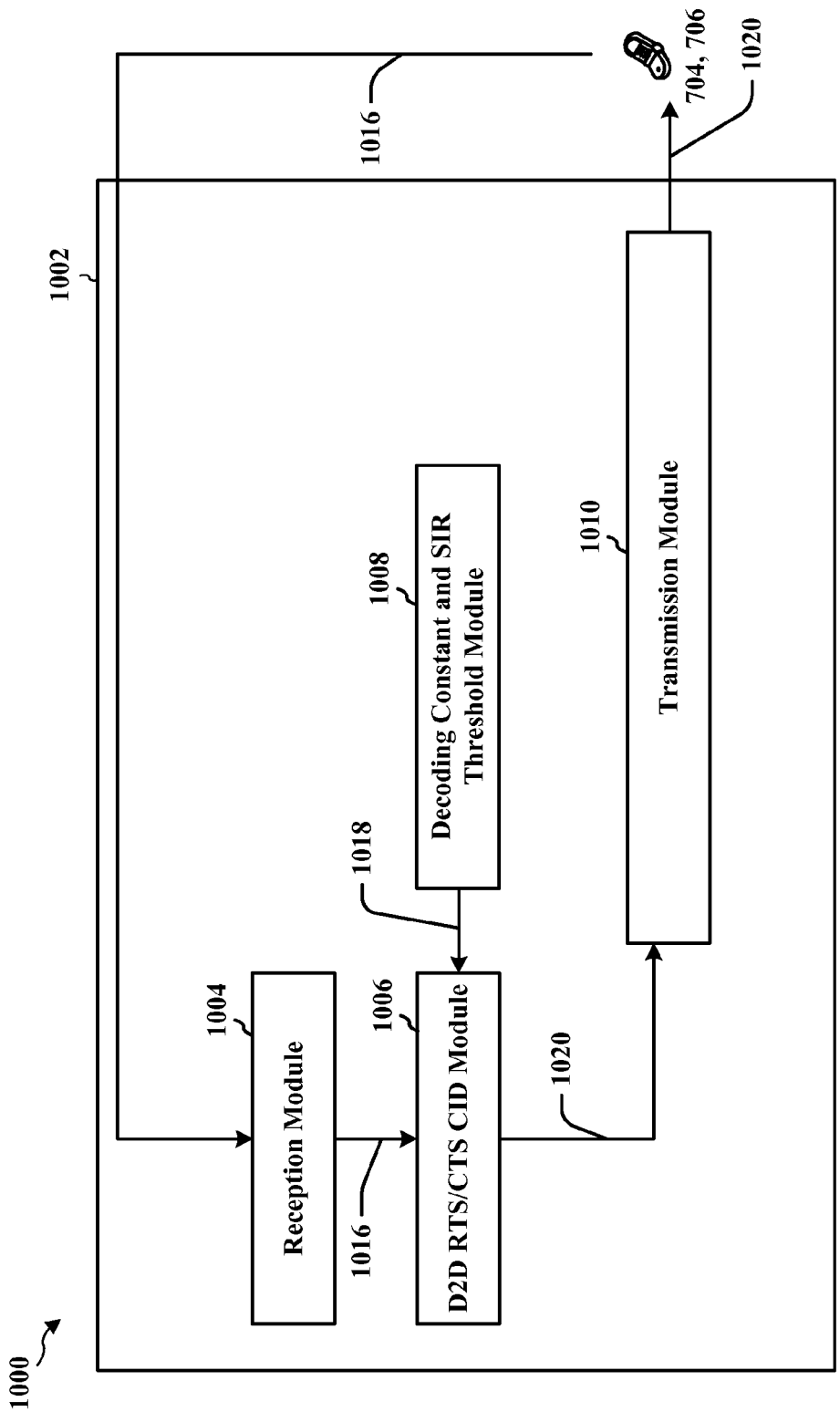
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a WAN entity such as, but not limited to, an eNodeB, a MME, etc.

The apparatus 1002 includes a reception module 1004 that may receive measures 1016 from a plurality of UEs. In an aspect, the measurements 1016 may be one or more channel gain values from UEs (e.g., 704, 706). Apparatus 1002 may further include D2D RTS/CTS CID module 1006. In an aspect, D2D RTS/CTS CID module 1006 may determine whether a CID can be reused based on the received channel gain values 1016. In another such aspect, D2D RTS/CTS CID module 1006 may further use one or more decoding constant values (γ, γ', etc.) 1018 with the channel gain values 1016 to determine whether the CID can be reused. In an aspect, (γ, γ', etc.) 1018 may be provided by decoding constant and SIR threshold module 1008. In another aspect, decoding constant and SIR threshold module 1008 may generate SIR threshold (β) for use in a UE based CID reuse determination. In another such aspect, where D2D RTS/CTS CID module 1006 indicates that a CID may be reused, a CID reuse indication 1020 may be provided to transmission module 1010 for communication to one or more the UEs 704, 706.

The apparatus may include additional modules that perform each of the steps of the algorithm in the aforementioned flow charts of FIG. 9. As such, each step in the aforementioned flow charts of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
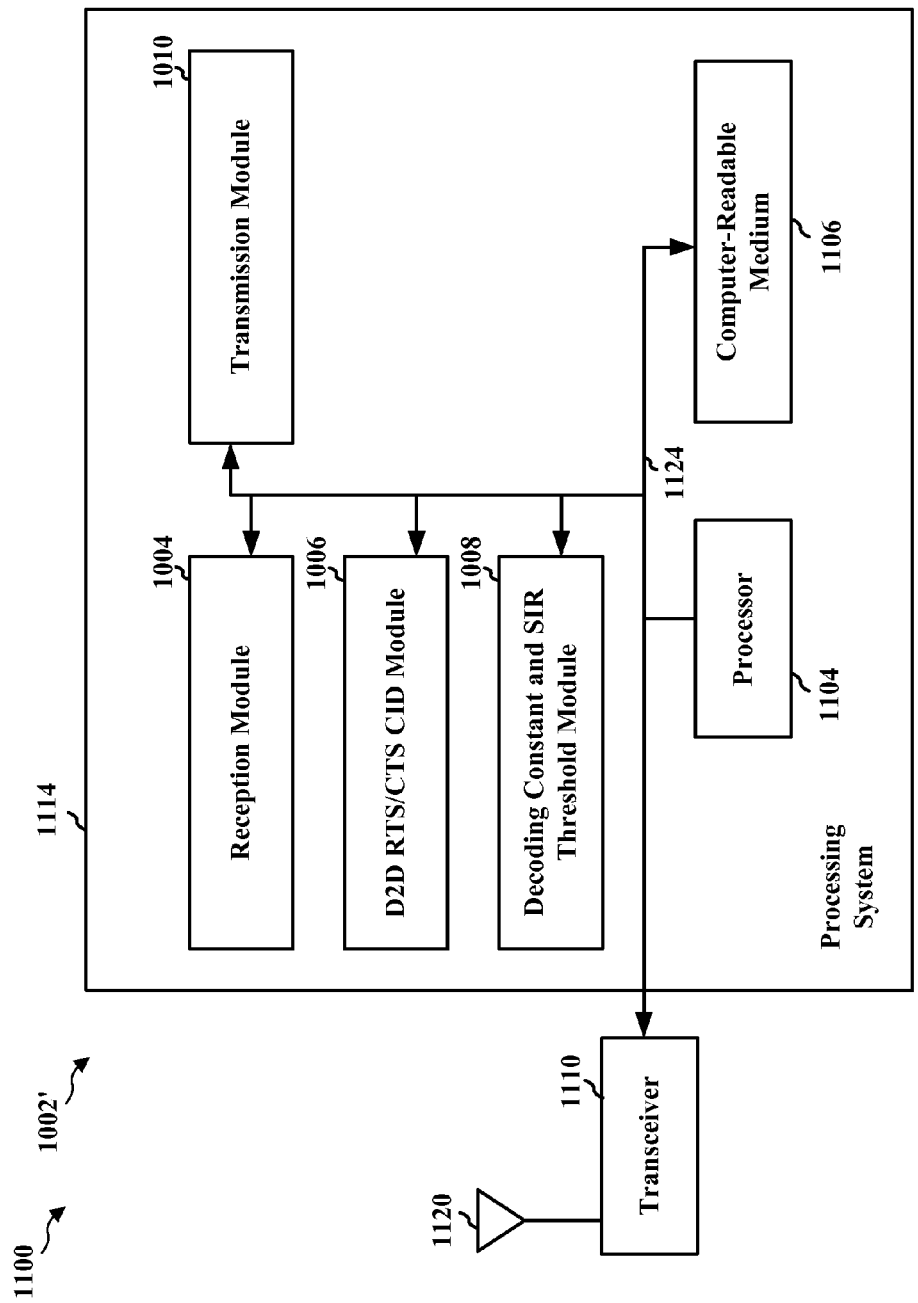
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, and 1010. The modules may be software modules running in the processor 1104, resident/stored in the computer readable medium 1106, one or more hardware modules coupled to the processor 1104, or some combination thereof. The processing system 1114 may be a component of the WAN entity 610 and may include the memory 676 and/or at least one of the TX processor 616, the RX processor 670, and the controller/processor 675.

In one configuration, the apparatus 1002/1002' for wireless communication includes means for receiving one or more channel gain values from a plurality of UEs, means for determining that a CID can be reused based on the received one or more channel gain values, and means for transmitting information indicating that the CID may be reused. In an aspect in which the plurality of UEs includes at least two UE pairs (AB, CD), the apparatus 1002/1002' means for determining may be configured to determine that interference from UE C to UE A and from UE D to UE A is less than a first threshold value, interference from UE C to UE B and from UE D to UE B is less than a second threshold value, and other analogous conditions concerning interference to UE C and UE D are met. In another aspect wherein the plurality of UEs includes at least three UE pairs (AB, CD, EF), the apparatus 1002/1002' means for determining may further be configured to determine that a total interference from UEs C, D, E and F to UE A is less than a first threshold value, a total interference from UEs C, D, E and F to UE B is less than a second threshold value, and other analogous conditions concerning interference to UEs C, D, E, and F are met. In an aspect, the CID may include a RB pair. In such an aspect, the RB pair may include a RB for RTS transmissions and a RB for CTS transmissions, and there may be at least 6 CID's available for D2D communications. The aforementioned means may be one or more of the aforementioned modules of the apparatus 902 and/or the processing system 1014 of the apparatus 902' configured to perform the functions recited by the aforementioned means. As described supra, the processing system 1114 may include the TX Processor 616, the RX Processor 670, and the controller/processor 675. As such, in one configuration, the aforementioned means may be the TX Processor 616, the RX Processor 670, and/or the controller/processor 675 configured to perform the functions recited by the aforementioned means.

FIG. 12 is a flow chart 1200 of a second method of wireless communication. The method may be performed by a UE.

At block 1202, a UE may measure direct power signals and inverse power echoes from two or more other UEs. In an aspect, for each link AB which already has a CID, UE A and B may periodically, on dedicated resources mapped to the CID, send two direct power signals (with power $P_A$ and $P_B$ respectively) and two inverse power echoes (with power $K/(P_B h_{BA})$ and $K/(P_A h_{AB})$ respectively). Such transmissions may allow the UE to obtain the direct power signals and inverse power echoes measurements.

At block 1204, the UE may determine whether the CID may potentially be reused based on the measured values. In an aspect, the UE may further use a SIR threshold value β to assist in determining whether the CID may potentially be reused. For example, a UE (e.g., UE C) may obtain measurements: direct power signal from UE A ($P_A$), direct power signal from UE B ($P_B$), direct power signal from UE D ($P_D$), the inverse power echo from UE A ($K/(P_B h_{BA})$), and inverse power echo from UE B ($K/(P_A h_{AB})$) where K is a constant that is greater than zero. In such an aspect, the UE may determine that the CID has a potential for reuse if $$\frac{P_D h_{DC}}{P_A h_{AC}} \geq \beta, \frac{P_D h_{DC}}{P_B h_{BC}} \geq \beta, \frac{P_A h_{AB}}{P_C h_{CB}} \geq \beta, \text{ and } \frac{P_B h_{BA}}{P_C h_{CA}} \geq \beta$$

(for any link AB that uses the CID). Note that the first two conditions can be checked since UE C has measured the direct power signals from UEs A, B, and D, and the last two conditions can be checked since UE C has measured the inverse power echoes from UEs A and B. Similarly to UE C, UE D may also measure the direct power signals and inverse power echoes from UEs A and B, and determine that the CID has a potential for reuse if $$\frac{P_C h_{CD}}{P_A h_{AD}} \geq \beta, \frac{P_C h_{CD}}{P_B h_{BD}} \geq \beta, \frac{P_A h_{AB}}{P_D h_{DB}} \geq \beta, \text{ and } \frac{P_B h_{BA}}{P_D h_{DA}} \geq \beta$$

(for any link AB that uses the CID).

If at block 1204, the UE determines that the CID is not available for reuse, then at block 1206 the UE may attempt to establish a D2D link with UE D using a different CID for RTS/CTS signaling.

By contrast, if at block 1204, the UE determines that the CID has a potential for reuse, then at block 1208, the UE may attempt to establish a D2D link with UE D using the determined CID. However, link CD can use the CID only if UE D has also determined that the CID can be potentially reused.

Figure 13:
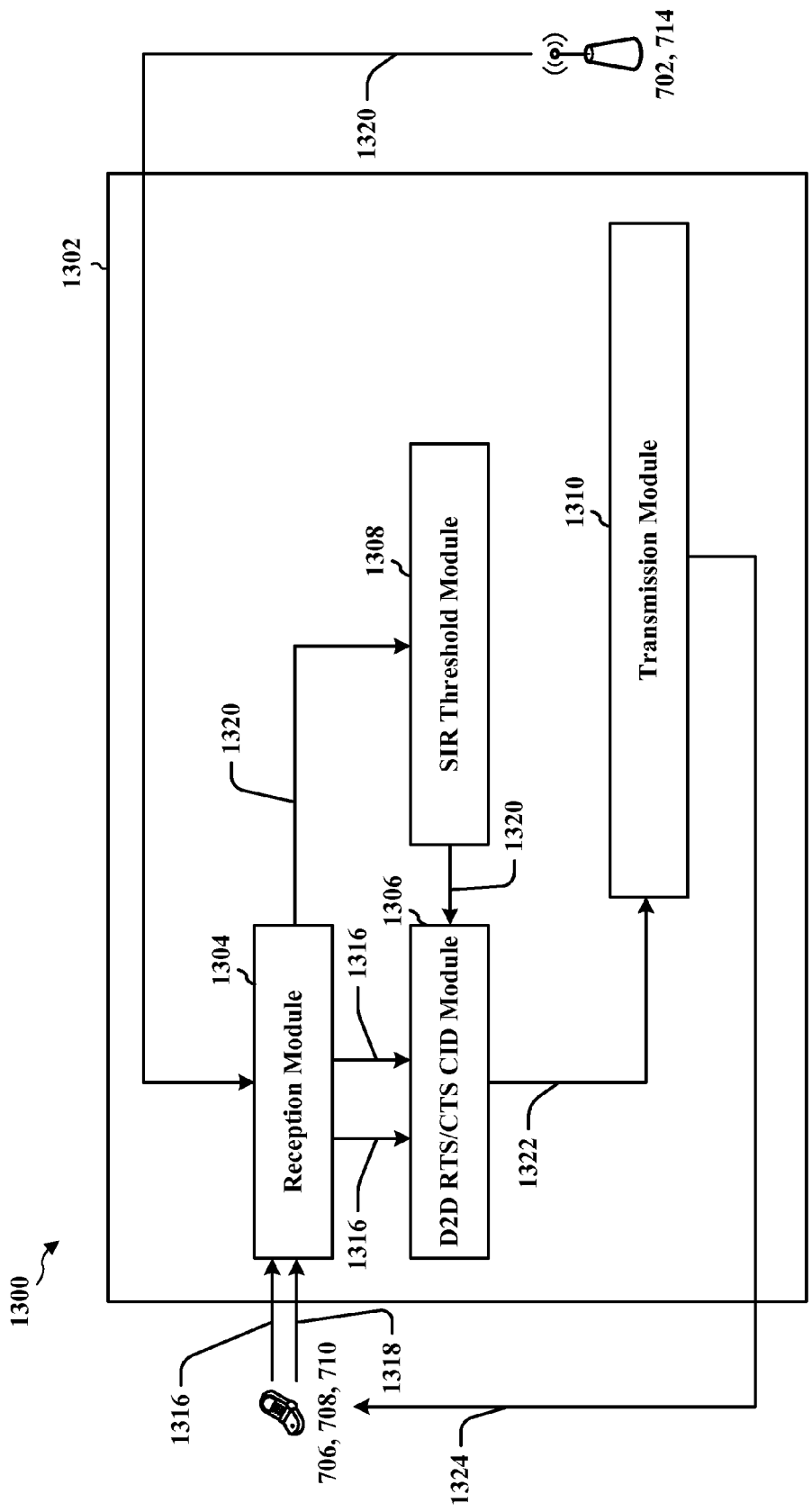
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a UE. The apparatus 1302 includes a reception module 1304 that may receives direct power values 1316 and inverse power echo values 1318 from one or more other UEs (e.g., 706, 708, 710). In an aspect, reception module 1304 may further receive a SIR threshold value β 1320 from a WAN entity (e.g., eNodeB 702, 714). In such an aspect, β 1320 may be communicated to SIR threshold module 1308. The apparatus 1302 further includes a D2D RTS/CTS CID module 1306 that may process the received direct power values 1316 and inverse power echo values 1318 along with the received β 1320 to determine whether a CID has a potential for reuse. In an aspect, D2D RTS/CTS CID module 1306 may determine that the CID 1322 has a potential for reuse if $$\frac{P_D h_{DC}}{P_A h_{AC}} \geq \beta, \frac{P_D h_{DC}}{P_B h_{BC}} \geq \beta, \frac{P_A h_{AB}}{P_C h_{CB}} \geq \beta \text{ and } \frac{P_B h_{BA}}{P_C h_{CA}} \geq \beta.$$

Apparatus 1302 may further include transmission module 1310 that may transmit RTS/CTS signaling and/or data transmissions as part of D2D communications 1324 with another UE 706. Thereafter, the apparatus 1302 may engage in D2D communications 1324 with the UE 706 using the determined CID 1322, if the CID is not rejected by UE 706.

The apparatus may include additional modules that perform each of the steps of the algorithm in the aforementioned flow charts of FIG. 12. As such, each step in the aforementioned flow charts of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
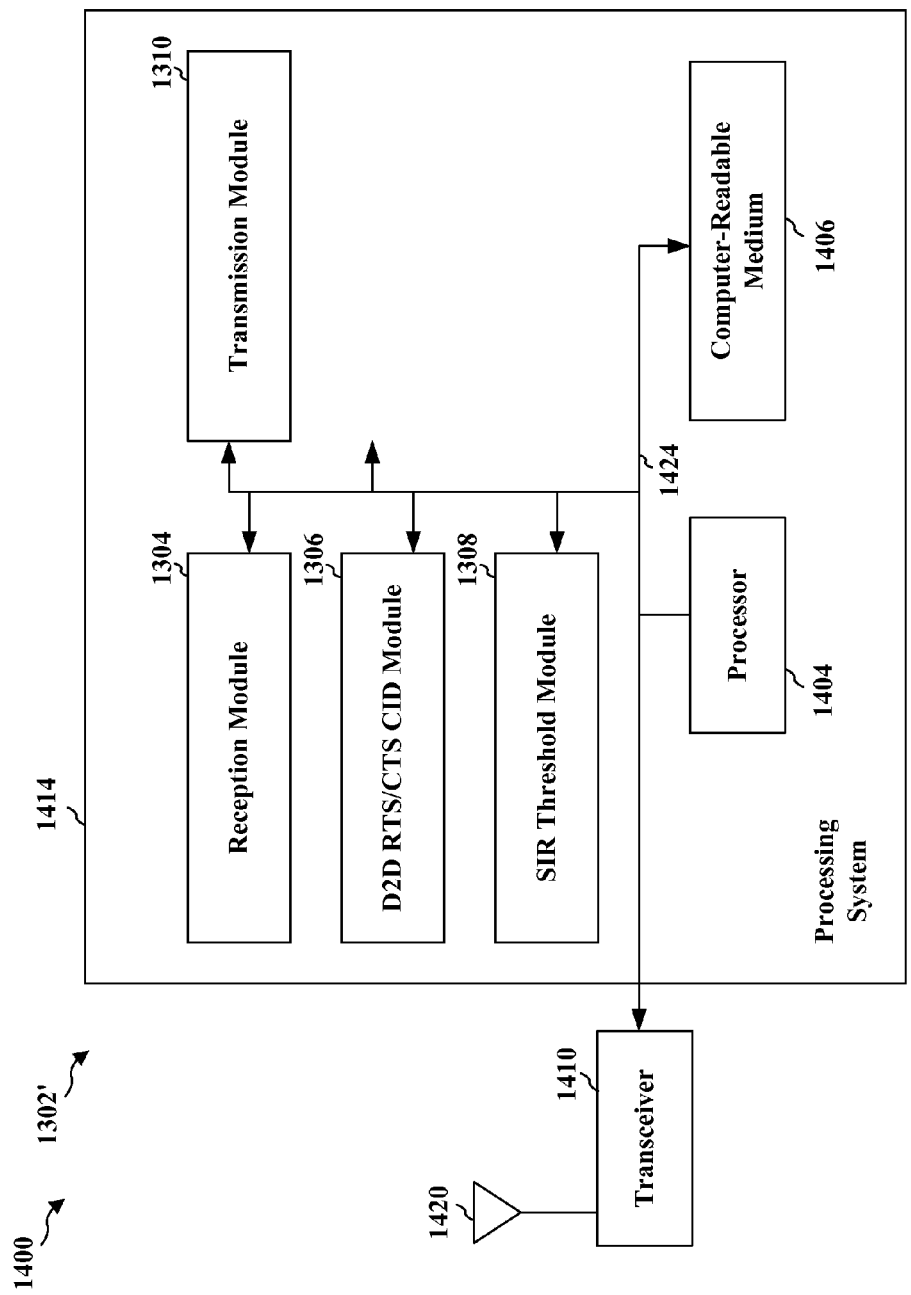
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1304, 1306, 1308, and 1310. The modules may be software modules running in the processor 1404, resident/stored in the computer readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1202' for wireless communication includes means for measuring, by a first UE, a direct power signal and an inverse power echo from each of a third UE and a fourth UE on a CID used for a link formed between the third UE and fourth UE, means for determining that the CID has a potential for reuse by a link formed between the first UE and a second UE for D2D RTS/CTS signaling, based at least in part on the measured direct power signals, measured the inverse power echoes, and a SIR threshold (β). In an aspect, the apparatus 1302/1202' means for determining may be further configured to confirm that $$\frac{P_D h_{DC}}{P_A h_{AC}} \geq \beta, \frac{P_D h_{DC}}{P_B h_{BC}} \geq \beta, \frac{P_A h_{AB}}{P_C h_{CB}} \geq \beta \text{ and } \frac{P_B h_{BA}}{P_C h_{CA}} \geq \beta,$$

wherein the third UE is (A), the fourth UE is (B), the first UE is (C), the second UE is (D). In another aspect, the apparatus 1302/1202' further includes means for establishing the link with the second UE (D) using the CID based on the confirmation. The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communications, comprising:
   receiving, by a wide area network (WAN) entity, a plurality of channel gain values from a plurality of user equipments (UEs), the plurality of UEs including at least two communicating UE pairs (AB, CD), the plurality of channel gain values including at least two channel gain values between UE A and UE B, UE A and UE C, UE A and UE D, UE B and UE C, UE B and UE D, or UE C and UE D;
   determining that a connection identifier (CID) can be reused for both the UE pair AB and the UE pair CD based on the received plurality of channel gain values including at least two channel gain values between UE A and UE B, UE A and UE C, UE A and UE D, UE B and UE C, UE B and UE D, or UE C and UE D; and
   transmitting information indicating that the CID may be reused.

2. The method of claim 1, wherein the CID comprises one resource block (RB) pair.

3. A method of communications, comprising:
   receiving, by a wide area network (WAN) entity, one or more channel gain values from a plurality of user equipments (UEs), wherein the plurality of UEs includes at least two UE pairs (AB, CD);
   determining that a connection identifier (CID) can be reused based on the received one or more channel gain values, wherein the determining comprises determining that interference from UE C to UE A and from UE D to UE A is less than a first threshold value, and interference from UE C to UE B and from UE D to UE B is less than a second threshold value; and
   transmitting information indicating that the CID may be reused.

4. The method of claim 3, wherein the one or more channel gain values include a channel gain between UE C and UE A and a channel gain value between UE B and UE A, wherein the interference from UE C to UE A comprises a transmission power of UE C multiplied by the channel gain between UE C and UE A, and wherein the first threshold value comprises a decoding constant value (γ) multiplied by a transmission power of UE B and further multiplied by the channel gain between UE B and UE A.

5. The method of claim 4, wherein the decoding constant value (γ) is defined by the wide area network (WAN) entity.

6. The method of claim 3, wherein the one or more channel gain values include a channel gain between UE C and UE B and a channel gain value between UE A and UE B, wherein the interference from UE C to UE B comprises a transmission power of UE C multiplied by the channel gain between UE C and UE B, and wherein the second threshold value comprises a decoding constant value (γ) multiplied by a transmission power of UE A and further multiplied by a channel gain between UE A and UE B.

7. A method of communications, comprising:
receiving, by a wide area network (WAN) entity, one or more channel gain values from a plurality of user equipments (UEs), wherein the plurality of UEs includes at least three UE pairs (AB, CD, EF);
determining that a connection identifier (CID) can be reused based on the received one or more channel gain values, wherein the CID may be reused by the at least three UE pairs, and wherein the determining comprises determining that a total interference from UEs C, D, E and F to UE A is less than a first threshold value, and a total interference from UEs C, D, E and F to UE B is less than a second threshold value; and
transmitting information indicating that the CID may be reused.

8. The method of claim 7, wherein the one or more channel gain values include a channel gain value between UE B and UE A, wherein the total interference from UEs C, D, E and F to UE A comprises a sum of received powers from UEs C, D, E and F to UE A, and wherein the first threshold value comprises a decoding constant value (γ') multiplied by a transmission power of UE B and further multiplied by the channel gain between UE B and UE A.

9. The method of claim 8, wherein the decoding constant value (γ') is defined by the wide area network (WAN) entity.

10. The method of claim 7, wherein the one or more channel gain values include a channel gain value between UE A and UE B, wherein the total interference from UEs C, D, E and F to UE B comprises a sum of received powers from UEs C, D, E and F to UE B, and wherein the second threshold value comprises a decoding constant value (γ') multiplied by a transmission power of UE A and further multiplied by the channel gain between UE A and UE B.

11. A method of communications, comprising:
receiving, by a wide area network (WAN) entity, one or more channel gain values from a plurality of user equipments (UEs);
determining that a connection identifier (CID) can be reused based on the received one or more channel gain values, wherein the CID comprises one resource block (RB) pair, wherein the RB pair comprises a RB for request to send (RTS) transmission and a RB for clear to send (CTS) transmission, and wherein there are at least 6 CID's available for device to device (D2D) communications; and
transmitting information indicating that the CID may be reused.

12. An apparatus for communication, comprising:
means for receiving, by a wide area network (WAN) entity, a plurality of channel gain values from a plurality of user equipments (UEs), the plurality of UEs including at least two communicating UE pairs (AB, CD), the plurality of channel gain values including at least two channel gain values between UE A and UE B, UE A and UE C, UE A and UE D, UE B and UE C, UE B and UE D, or UE C and UE D;
means for determining that a connection identifier (CID) can be reused for both the UE pair AB and the UE pair CD based on the received plurality of channel gain values including at least two channel gain values between UE A and UE B, UE A and UE C, UE A and UE D, UE B and UE C, UE B and UE D, or UE C and UE D; and means for transmitting information indicating that the CID may be reused.

13. The apparatus of claim 12, wherein the CID comprises one resource block (RB) pair.

14. An apparatus for communication, comprising:
means for receiving, by a wide area network (WAN) entity, one or more channel gain values from a plurality of user equipments (UEs), wherein the plurality of UEs includes at least two UE pairs (AB, CD);
means for determining that a connection identifier (CID) can be reused based on the received one or more channel gain values, wherein the means for determining is configured to determine that interference from UE C to UE A and from UE D to UE A is less than a first threshold value, and interference from UE C to UE B and from UE D to UE B is less than a second threshold value; and
means for transmitting information indicating that the CID may be reused.

15. The apparatus of claim 14, wherein the one or more channel gain values include a channel gain between UE C and UE A and a channel gain value between UE B and UE A, wherein the interference from UE C to UE A comprises a transmission power of UE C multiplied by the channel gain between UE C and UE A, and wherein the first threshold value comprises a decoding constant value (γ) multiplied by a transmission power of UE B and further multiplied by the channel gain between UE B and UE A.

16. The apparatus of claim 15, wherein the decoding constant value (γ) is defined by the wide area network (WAN) entity.

17. The apparatus of claim 14, wherein the one or more channel gain values include a channel gain between UE C and UE B and a channel gain value between UE A and UE B, wherein the interference from UE C to UE B comprises a transmission power of UE C multiplied by the channel gain between UE C and UE B, and wherein the second threshold value comprises a decoding constant value (γ) multiplied by a transmission power of UE A and further multiplied by a channel gain between UE A and UE B.

18. An apparatus for communication, comprising:
means for receiving, by a wide area network (WAN) entity, one or more channel gain values from a plurality of user equipments (UEs), wherein the plurality of UEs includes at least three UE pairs (AB, CD, EF);
means for determining that a connection identifier (CID) can be reused based on the received one or more channel gain values, wherein the CID may be reused by the at least three UE pairs, and wherein the means for determining is configured to determine that a total interference from UEs C, D, E and F to UE A is less than a first threshold value, and a total interference from UEs C, D, E and F to UE B is less than a second threshold value; and
means for transmitting information indicating that the CID may be reused.

19. The apparatus of claim 18, wherein the one or more channel gain values include a channel gain value between UE B and UE A, wherein the total interference from UEs C, D, E and F to UE A comprises a sum of received powers from UEs C, D, E and F to UE A, and wherein the first threshold value comprises a decoding constant value (γ') multiplied by a transmission power of UE B and further multiplied by the channel gain between UE B and UE A.

20. The apparatus of claim 19, wherein the decoding constant value (γ') is defined by the wide area network (WAN) entity.

21. The apparatus of claim 18, wherein the one or more channel gain values include a channel gain value between UE A and UE B, wherein the total interference from UEs C, D, E and F to UE B comprises a sum of received powers from UEs C, D, E and F to UE B, and wherein the second threshold value comprises a decoding constant value ($\gamma'$) multiplied by a transmission power of UE A and further multiplied by the channel gain between UE A and UE B.

22. An apparatus for communication, comprising:
means for receiving, by a wide area network (WAN) entity, one or more channel gain values from a plurality of user equipments (UEs);
means for determining that a connection identifier (CID) can be reused based on the received one or more channel gain values, wherein the CID comprises one resource block (RB) pair, wherein the RB pair comprises a RB for request to send (RTS) transmission and a RB for clear to send (CTS) transmission, and wherein there are at least 6 CID's available for device to device (D2D) communications; and
means for transmitting information indicating that the CID may be reused.

23. An apparatus for wireless communication, comprising:
a processing system configured to:
receive, by a wide area network (WAN) entity, a plurality of channel gain values from a plurality of user equipments (UEs), the plurality of UEs including at least two communicating UE pairs (AB, CD), the plurality of channel gain values including at least two channel gain values between UE A and UE B, UE A and UE C, UE A and UE D, UE B and UE C, UE B and UE D, or UE C and UE D;
determine that a connection identifier (CID) can be reused for both the UE pair AB and the UE pair CD based on the received plurality of channel gain values including at least two channel gain values between UE A and UE B, UE A and UE C, UE A and UE D, UE B and UE C, UE B and UE D, or UE C and UE D; and
transmit information indicating that the CID may be reused.

24. The apparatus of claim 23, wherein the CID comprises one resource block (RB) pair.

25. An apparatus for wireless communication, comprising:
a processing system configured to:
receive, by a wide area network (WAN) entity, one or more channel gain values from a plurality of user equipments (UEs), wherein the plurality of UEs includes at least two UE pairs (AB, CD);
determine that a connection identifier (CID) can be reused based on the received one or more channel gain values, wherein, to determine that the CID can be reused, the processing system is configured to determine that interference from UE C to UE A and from UE D to UE A is less than a first threshold value, and interference from UE C to UE B and from UE D to UE B is less than a second threshold value; and
transmit information indicating that the CID may be reused.

26. The method of claim 25, wherein the one or more channel gain values include a channel gain between UE C and UE A and a channel gain value between UE B and UE A, wherein the interference from UE C to UE A comprises a transmission power of UE C multiplied by the channel gain between UE C and UE A, and wherein the first threshold value comprises a decoding constant value ($\gamma$) multiplied by a transmission power of UE B and further multiplied by the channel gain between UE B and UE A.

27. The apparatus of claim 26, wherein the decoding constant value ($\gamma$) is defined by the wide area network (WAN) entity.

28. The method of claim 25, wherein the one or more channel gain values include a channel gain between UE C and UE B and a channel gain value between UE A and UE B, wherein the interference from UE C to UE B comprises a transmission power of UE C multiplied by the channel gain between UE C and UE B, and wherein the second threshold value comprises a decoding constant value ($\gamma$) multiplied by a transmission power of UE A and further multiplied by a channel gain between UE A and UE B.

29. An apparatus for wireless communication, comprising:
a processing system configured to:
receive, by a wide area network (WAN) entity, one or more channel gain values from a plurality of user equipments (UEs), wherein the plurality of UEs includes at least three UE pairs (AB, CD, EF);
determine that a connection identifier (CID) can be reused based on the received one or more channel gain values, wherein the CID may be reused by the at least three UE pairs, and wherein, to determine that the CID can be reused, the processing system is configured to determine that a total interference from UEs C, D, E and F to UE A is less than a first threshold value, and a total interference from UEs C, D, E and F to UE B is less than a second threshold value; and
transmit information indicating that the CID may be reused.

30. The apparatus of claim 29, wherein the one or more channel gain values include a channel gain value between UE B and UE A, wherein the total interference from UEs C, D, E and F to UE A comprises a sum of received powers from UEs C, D, E and F to UE A, and wherein the first threshold value comprises a decoding constant value ($\gamma'$) multiplied by a transmission power of UE B and further multiplied by the channel gain between UE B and UE A.

31. The apparatus of claim 30, wherein the decoding constant value ($\gamma'$) is defined by the wide area network (WAN) entity.

32. The apparatus of claim 29, wherein the one or more channel gain values include a channel gain value between UE A and UE B, wherein the total interference from UEs C, D, E and F to UE B comprises a sum of received powers from UEs C, D, E and F to UE B, and wherein the second threshold value comprises a decoding constant value ($\gamma'$) multiplied by a transmission power of UE A and further multiplied by the channel gain between UE A and UE B.

33. An apparatus for wireless communication, comprising:
a processing system configured to:
receive, by a wide area network (WAN) entity, one or more channel gain values from a plurality of user equipments (UEs);
determine that a connection identifier (CID) can be reused based on the received one or more channel gain values, wherein the CID comprises one resource block (RB) pair, wherein the RB pair comprises a RB for request to send (RTS) transmission and a RB for clear to send (CTS) transmission, and wherein there are at least 6 CID's available for device to device (D2D) communications; and
transmit information indicating that the CID may be reused.

34. A computer program product, comprising:
a non-transitory computer-readable medium comprising code for:

receiving, by a wide area network (WAN) entity, a plurality of channel gain values from a plurality of user equipments (UEs), the plurality of UEs including at least two communicating UE pairs (AB, CD), the plurality of channel gain values including at least two channel gain values between UE A and UE B, UE A and UE C, UE A and UE D, UE B and UE C, UE B and UE D, or UE C and UE D;

determining that a connection identifier (CID) can be reused for both the UE pair AB and the UE pair CD based on the received plurality of channel gain values including at least two channel gain values between UE A and UE B, UE A and UE C, UE A and UE D, UE B and UE C, UE B and UE D, or UE C and UE D; and transmitting information indicating that the CID may be reused.

35. The computer program product of claim 34, wherein the CID comprises one resource block (RB) pair.

36. A computer program product, comprising:

a non-transitory computer-readable medium comprising code for:

receiving, by a wide area network (WAN) entity, one or more channel gain values from a plurality of user equipments (UEs), wherein the plurality of UEs includes at least two UE pairs (AB, CD);

determining that a connection identifier (CID) can be reused based on the received one or more channel gain values, wherein the code for determining that the CID can be reused is configured to determine that interference from UE C to UE A and from UE D to UE A is less than a first threshold value, and interference from UE C to UE B and from UE D to UE B is less than a second threshold value; and transmitting information indicating that the CID may be reused.

37. The computer program product of claim 36, wherein the one or more channel gain values include a channel gain between UE C and UE A and a channel gain value between UE B and UE A, wherein the interference from UE C to UE A comprises a transmission power of UE C multiplied by the channel gain between UE C and UE A, and wherein the first threshold value comprises a decoding constant value ($\gamma$) multiplied by a transmission power of UE B and further multiplied by the channel gain between UE B and UE A.

38. The computer program product of claim 37, wherein the decoding constant value ($\gamma$) is defined by the wide area network (WAN) entity.

39. The computer program product of claim 36, wherein the one or more channel gain values include a channel gain between UE C and UE B and a channel gain value between UE A and UE B, wherein the interference from UE C to UE B comprises a transmission power of UE C multiplied by the channel gain between UE C and UE B, and wherein the second threshold value comprises a decoding constant value ($\gamma$) multiplied by a transmission power of UE A and further multiplied by a channel gain between UE A and UE B.

40. A computer program product, comprising:

a non-transitory computer-readable medium comprising code for:

receiving, by a wide area network (WAN) entity, one or more channel gain values from a plurality of user equipments (UEs), wherein the plurality of UEs includes at least three UE pairs (AB, CD, EF);

determining that a connection identifier (CID) can be reused based on the received one or more channel gain values, wherein the CID may be reused by the at least three UE pairs, and wherein the code for determining that the CID can be reused is configured to determine that a total interference from UEs C, D, E and F to UE A is less than a first threshold value, and a total interference from UEs C, D, E and F to UE B is less than a second threshold value; and transmitting information indicating that the CID may be reused.

41. The computer program product of claim 10, wherein the one or more channel gain values include a channel gain value between UE B and UE A, wherein the total interference from UEs C, D, E and F to UE A comprises a sum of received powers from UEs C, D, E and F to UE A, and wherein the first threshold value comprises a decoding constant value ($\gamma'$) multiplied by a transmission power of UE B and further multiplied by the channel gain between UE B and UE A.

42. The computer program product of claim 41, wherein the decoding constant value ($\gamma'$) is defined by the wide area network (WAN) entity.

43. The computer program product of claim 40, wherein the one or more channel gain values include a channel gain value between UE A and UE B, wherein the total interference from UEs C, D, E and F to UE B comprises a sum of received powers from UEs C, D, E and F to UE B, and wherein the second threshold value comprises a decoding constant value ($\gamma'$) multiplied by a transmission power of UE A and further multiplied by the channel gain between UE A and UE B.

44. A computer program product, comprising:

a non-transitory computer-readable medium comprising code for:

receiving, by a wide area network (WAN) entity, one or more channel gain values from a plurality of user equipments (UEs);

determining that a connection identifier (CID) can be reused based on the received one or more channel gain values, wherein the CID comprises one resource block (RB) pair, wherein the RB pair comprises a RB for request to send (RTS) transmission and a RB for clear to send (CTS) transmission, and wherein there are at least 6 CID's available for device to device (D2D) communications; and transmitting information indicating that the CID may be reused.

* * * * *